US006654766B1

(12) United States Patent
Degenaro et al.

(10) Patent No.: US 6,654,766 B1
(45) Date of Patent: Nov. 25, 2003

(54) SYSTEM AND METHOD FOR CACHING SETS OF OBJECTS

(75) Inventors: Louis R. Degenaro, White Plains, NY (US); David L. Ehnebuske, Georgetown, TX (US); Arun K. Iyengar, Yorktown Heights, NY (US); Barbara Jane Alspach McKee, Austin, TX (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,269

(22) Filed: Apr. 4, 2000

(51) Int. Cl.$^7$ .............................................. G06F 17/30
(52) U.S. Cl. .................................................. 707/104.1
(58) Field of Search ........................ 707/4, 6, 10, 101, 707/103 R, 103 Y, 104.1, 201, 202, 203; 709/213, 223, 238; 345/440; 711/118

(56) References Cited

U.S. PATENT DOCUMENTS

| | | | | |
|---|---|---|---|---|
| 5,625,818 A | | 4/1997 | Zarmer et al. .............. | 395/615 |
| 5,649,085 A | * | 7/1997 | Lehr .......................... | 345/440 |
| 5,933,849 A | * | 8/1999 | Srbljic et al. .............. | 711/118 |
| 6,029,175 A | * | 2/2000 | Chow et al. ................. | 707/10 |
| 6,253,226 B1 | * | 6/2001 | Chidambaran et al. ..... | 707/101 |

OTHER PUBLICATIONS

PCT Publication WO 97/16023 A1, May 1, 1997.
Amagasa et al., "Implementing Time–Interval Class for Managing Temporal Data", Proceedings. International Workshop on Database and Expert Systems Applications, Aug. 26, 1998, pp. 843–849.

* cited by examiner

Primary Examiner—Diane D. Mizrahi
Assistant Examiner—Apu M Mofiz
(74) Attorney, Agent, or Firm—F. Chau & Associates, LLC

(57) ABSTRACT

A system and method for managing cacheable sets of objects having explicit lifetime specifications, wherein a time-based cache manager maintains and updates one or more sets of objects stored in the cache. A cached set of objects comprises objects having start times and/or end times representing, respectively, times at which such objects become valid and expire. An update time is determined for a given cached set of objects based, in part, on the start times and end times of objects comprising the cached set of objects. When a request for the retrieval of an object from the given cached set of objects (or the entire cached set) is received, a determination is made if the cached set of objects is valid at the time of the request based on the update time. If the cached set of objects is not valid because, e.g., the update time has elapsed, the cached set of objects is updated (and any other cached sets, if necessary) by deleting and/or adding objects to the cached set of objects having start times and end times that meet predefined time criteria for inclusion in the cached set of objects.

45 Claims, 7 Drawing Sheets

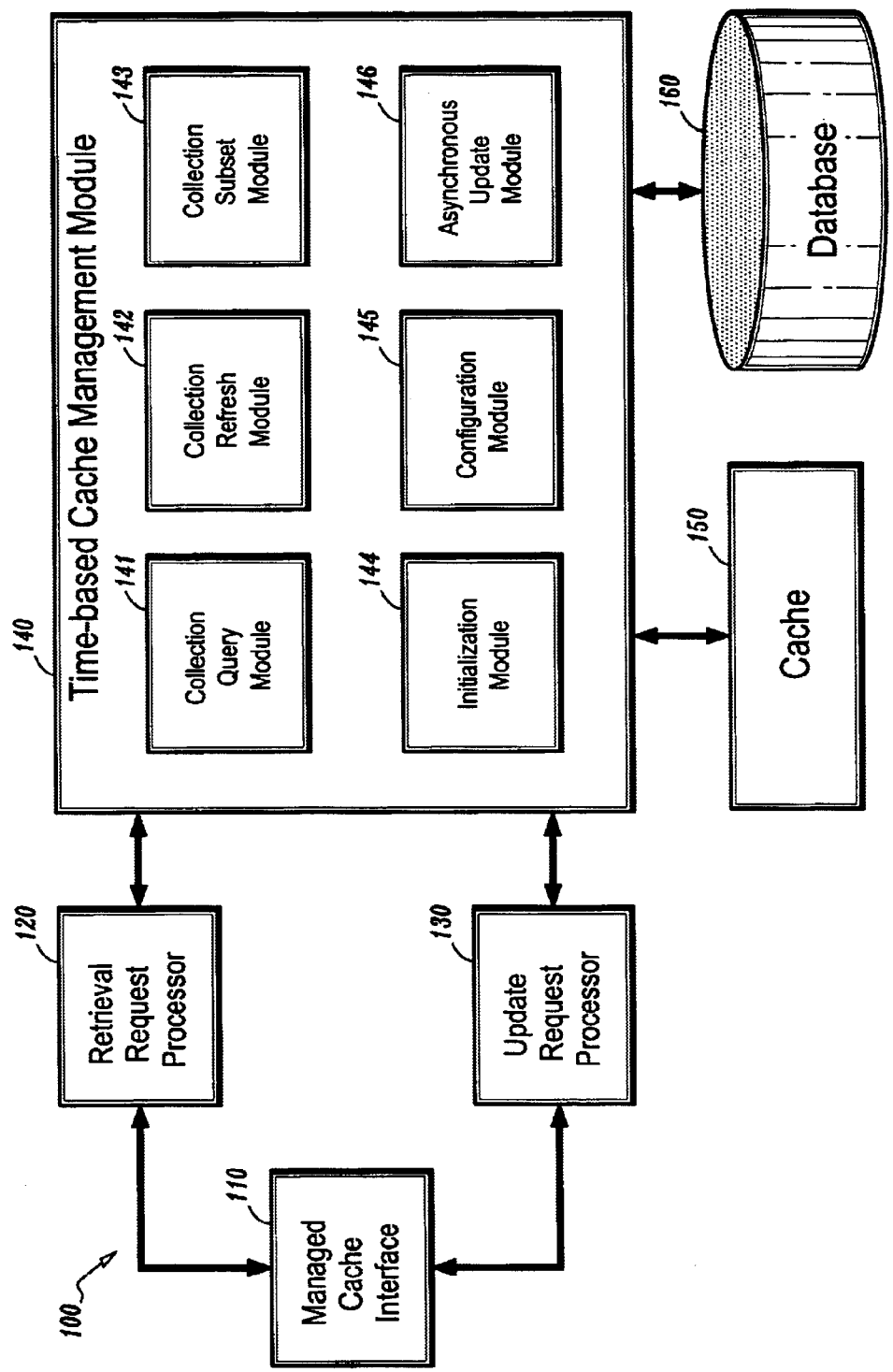
FIG. 1.0

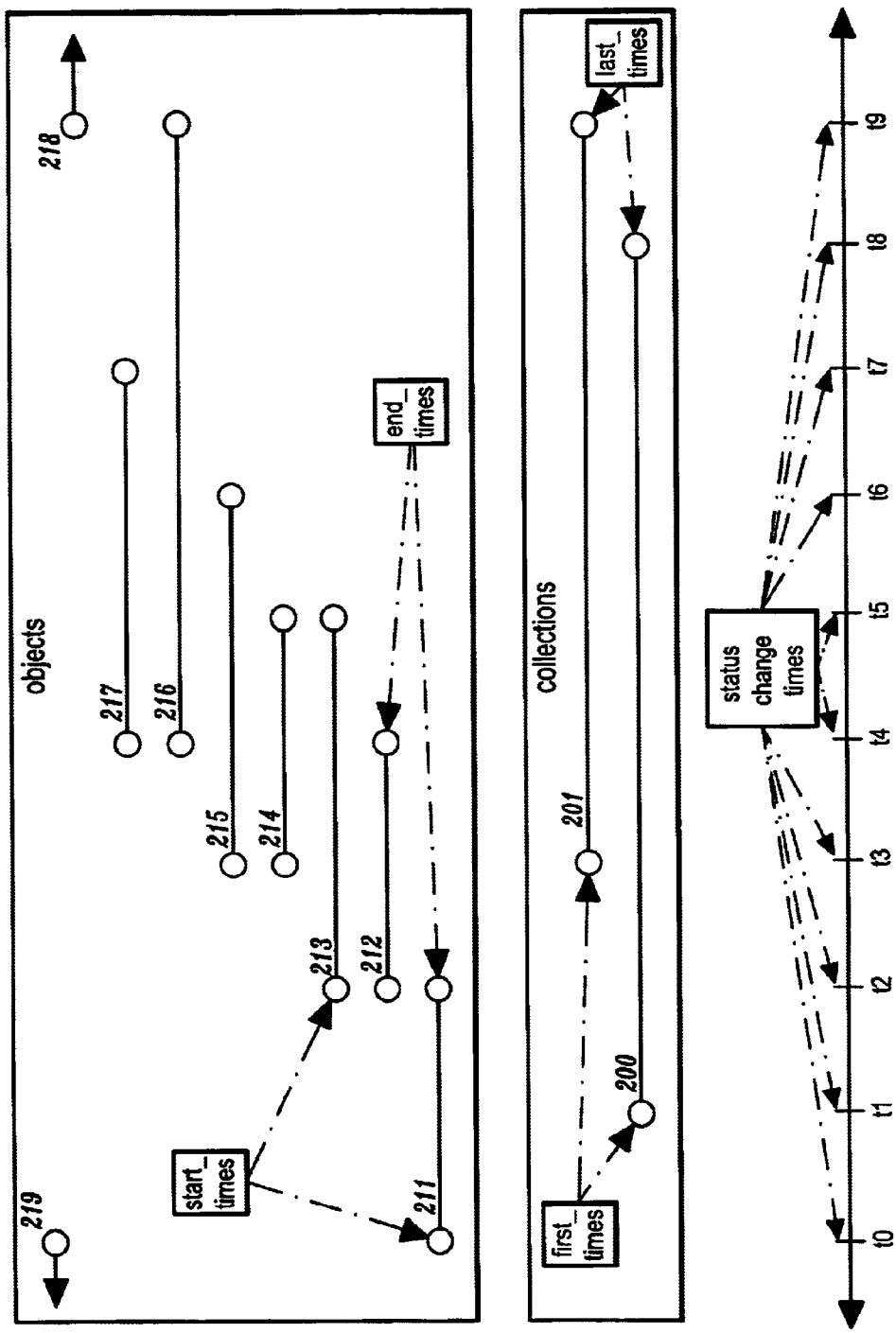
FIG. 2.0

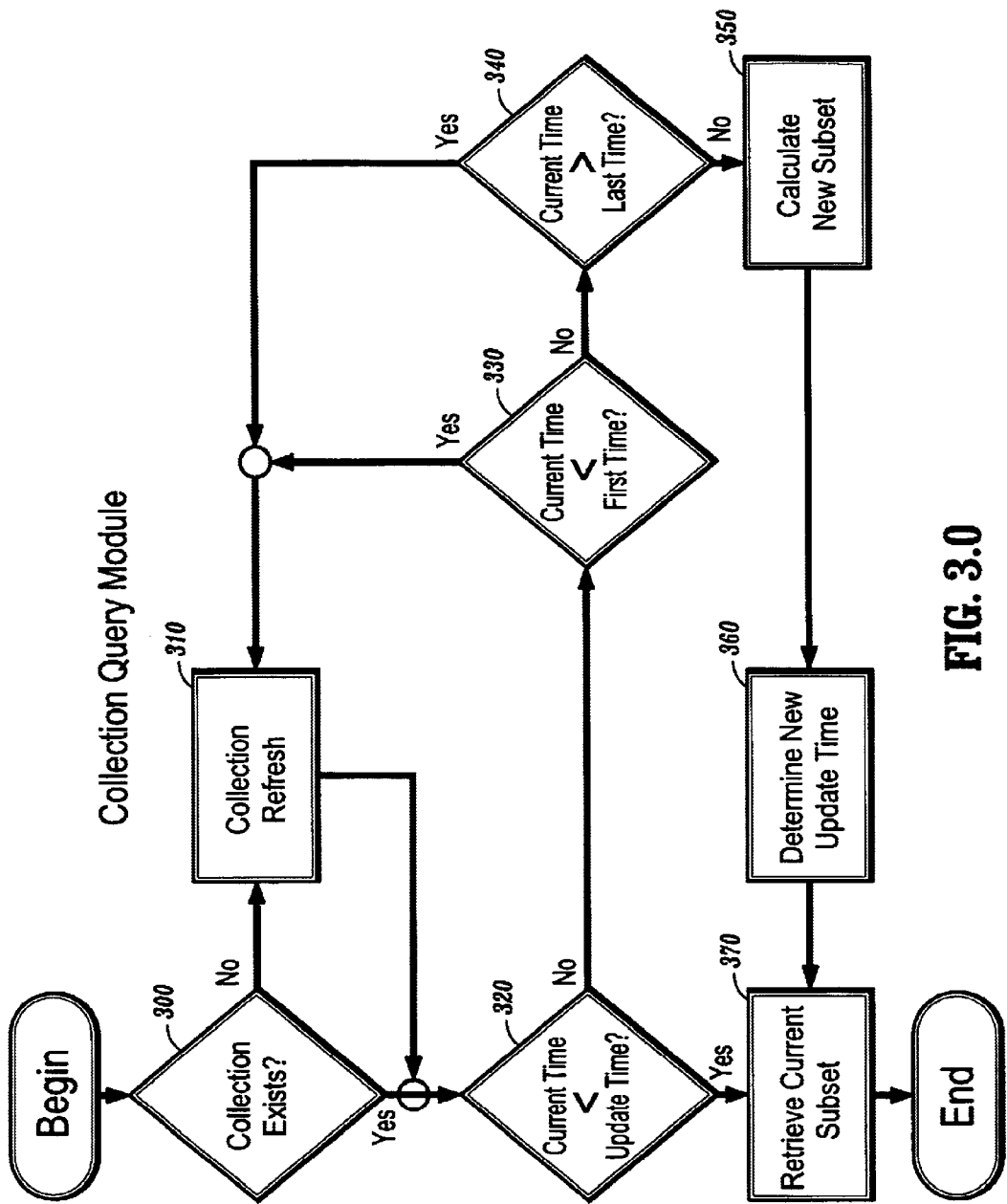
FIG. 3.0

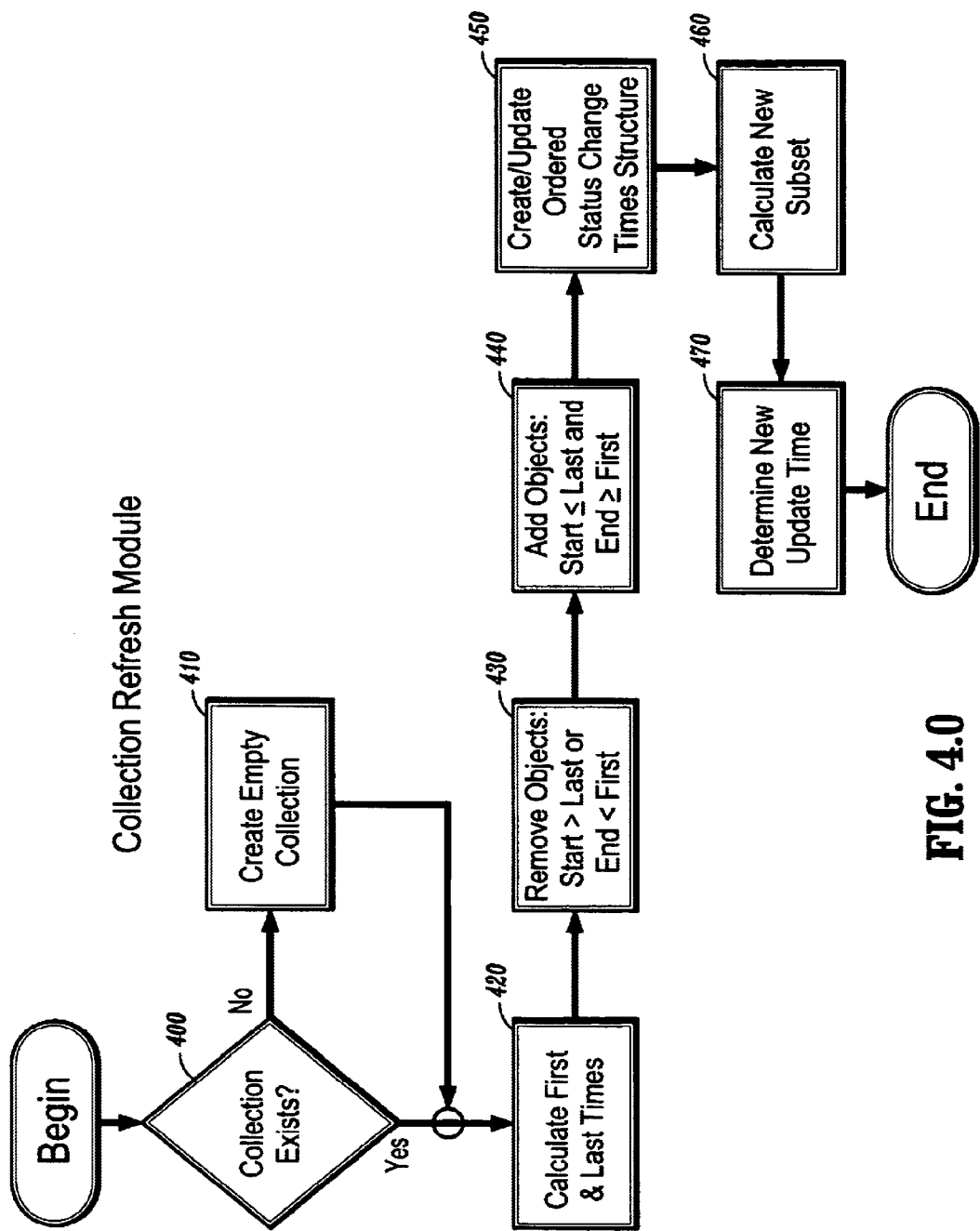
FIG. 4.0

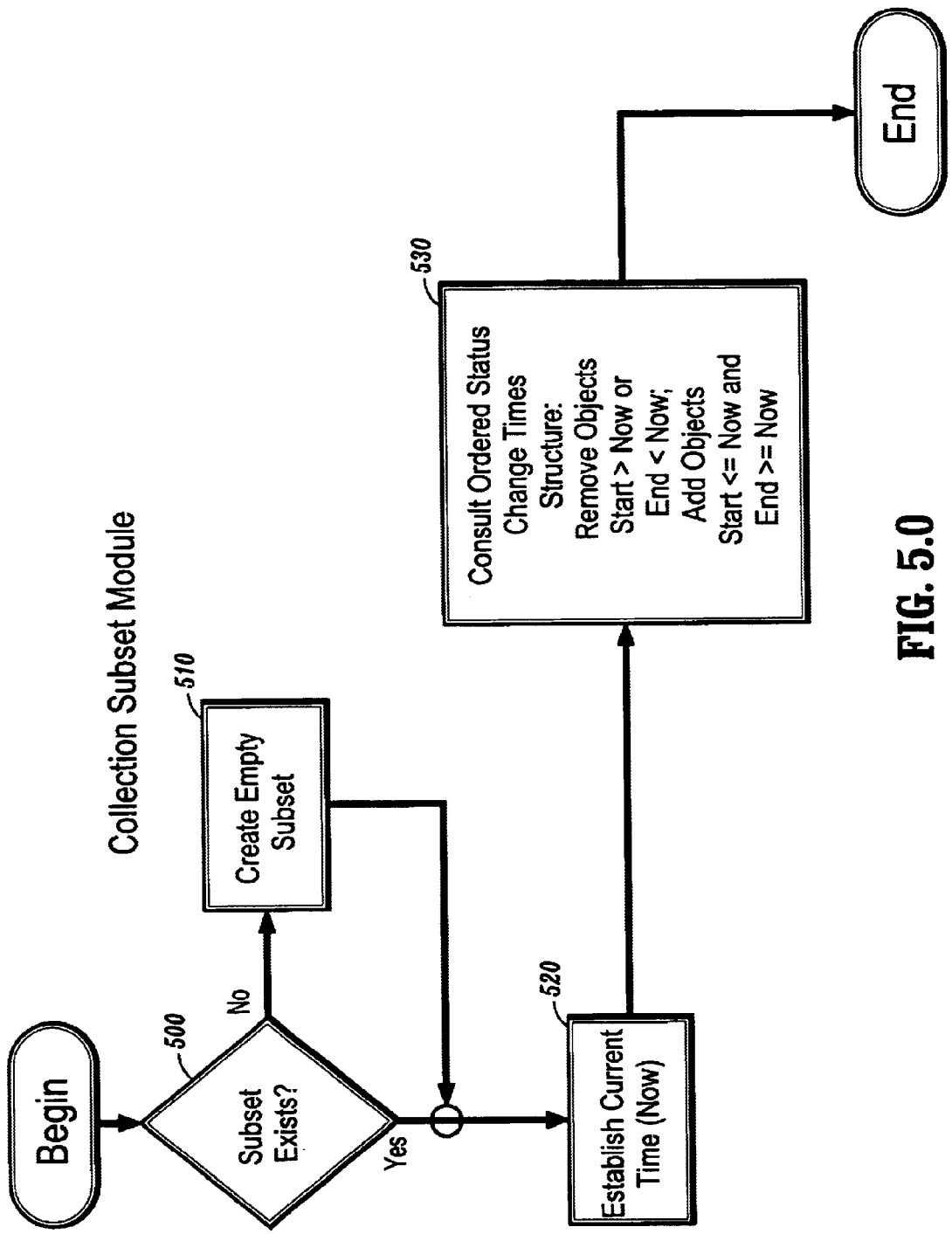
FIG. 5.0

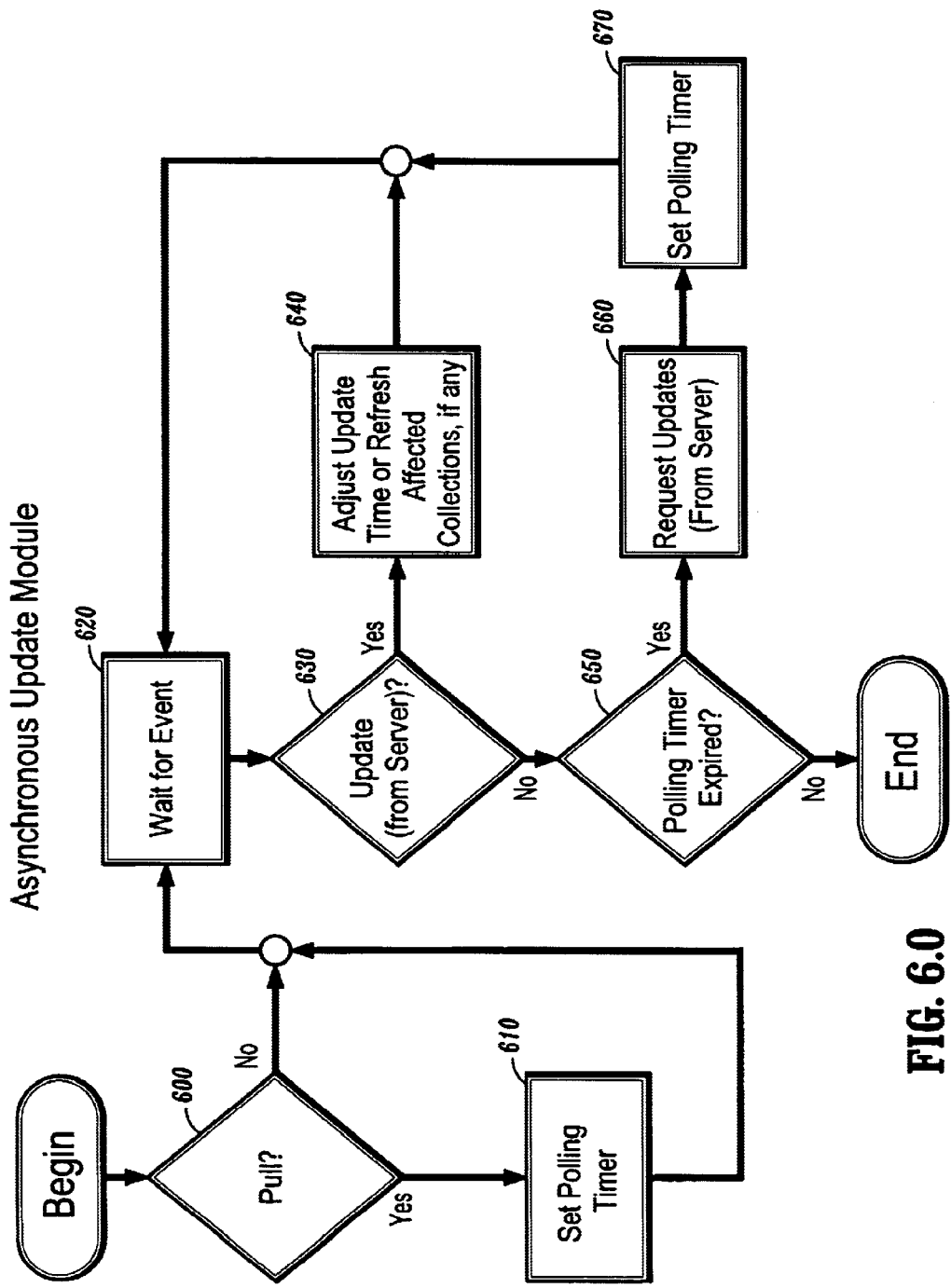
FIG. 6.0

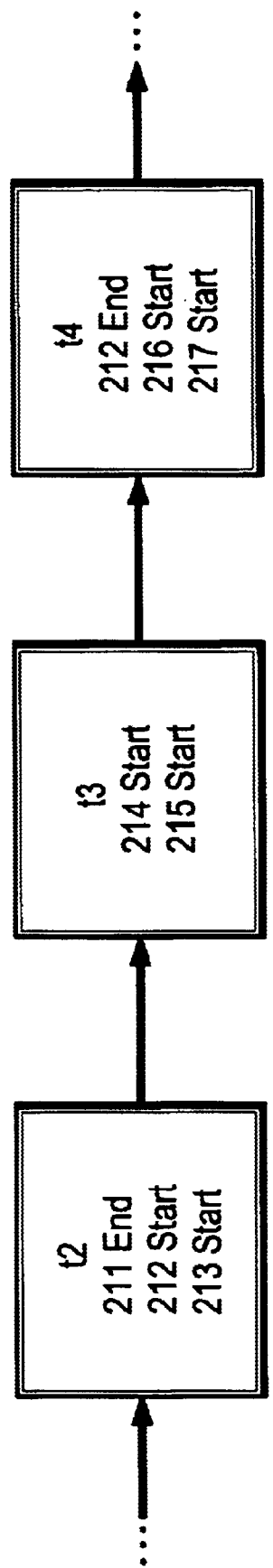
FIG. 7.0

SYSTEM AND METHOD FOR CACHING SETS OF OBJECTS

BACKGROUND

1. Technical Field

The present invention relates generally to caching information in a data processing system and, in particular, to a system and method for efficiently managing cacheable sets of objects having lifetime specifications.

2. Description of Related Art

Caching is a technique that is commonly employed to improve performance in many computer systems. Caching involves storing an entity that is frequently requested and/or expensive to fetch or generate in a storage area known as a cache. For example, in an object-oriented environment, caching an object can minimize the cost for fetching or materializing an object since subsequent requests can be satisfied from the cache, a process which incurs significantly less overhead, thus resulting in improved performance overall. In some cases, the entities being cached comprise sets of other entities. For example, a cached set may contain the set of all objects which satisfy a query. In object-oriented and other database applications, queries are often issued to databases. These can be expensive to make in terms of, e.g., computation time and memory. Therefore, caching techniques may be utilized for reducing the overhead associated with issuing queries by caching query results such that the query need only be issued once. Subsequent requests for the same query would be able to access the corresponding query results from the cache.

A key problem associated with caching objects and sets of objects is that of preventing the cache from supplying stale data to its clients. Cached data becomes stale whenever actual values have changed but cached copies of these values have not been updated to reflect the changes.

Accordingly, there is a need for a system and method for anticipating and reconciling changes that would cause a cache to become stale in order to alleviate the problem of obsolete cached data at client request time.

SUMMARY OF THE INVENTION

The present invention is generally directed to a system and method for efficiently caching sets of objects in a data processing application. In particular, the present invention is directed to a system and method for providing time-based management of a cache in an object-oriented computing environment, wherein a time-based cache manager maintains and updates one or more sets of objects stored in the cache.

In one aspect of the present invention, objects are assigned start_times and/or end_times. In addition, an object may have multiple start_times and/or end_times. Furthermore, collections (sets of objects) are designated by assigning first_times and last_times. For a given collection, objects having start_times and/or end_times that meet predefined criteria are selected as members of the collection. A collection may be stored in a cache or other storage medium.

In another aspect of the present invention, a given collection forms a "superset" of objects from which queries are satisfied without having to re-fetch or re-materialize such objects. A time-based cache manager determines, from the "superset" of objects, a "subset" of objects that satisfies the query at the time the request is made. The subset of objects is stored in a cache.

In yet another aspect of the invention, the time-based cache manager comprises a mechanism to "update" the cache. In one embodiment, the cache manager will determine an update_time for a given cached subset of objects based, in part, on start_times and end_times of objects that are members of a cached subset. Whenever a request for the query is received before the last_time of the collection, the cache manager determines whether the cached subset of objects is still valid by checking its update_time against the current_time. If the cached subset of objects has expired (e.g., the current_time is greater than the update_time) the cache manager automatically updates the cached subset with objects in the collection (without having to contact the server) by removing objects that have expired and adding objects having elapsed start_times and non-elapsed end_ times, and then assigning a new update_time for the cached subset.

In another aspect of the present invention, if the cache manager determines that a cached subset of objects has expired (e.g., the current_time is greater than the update_ time) and that the current_time is either less than the first_time or greater than the last_time of the corresponding collection (superset), the cache manager will query a server to update the collection of objects and update the cached subset of objects from the updated collection.

These and other aspects, features, and advantages of the present invention will become apparent from the following detailed description of the preferred embodiments, which is to be read in connection with the accompanying drawings.

BRIEF DESCRIPTION OF THE DRAWINGS

FIG. 1 is a block diagram of a system for managing sets of cacheable entities in accordance with an embodiment of the present invention;

FIG. 2 is a timeline diagram showing example relative life spans of entities and entity sets in accordance with an embodiment of the present invention;

FIG. 3 is a flow diagram of a collection query process in accordance with one aspect of the present invention;

FIG. 4 is a flow diagram of a collection refresh process in accordance with one aspect of the present invention;

FIG. 5 is a flow diagram of a method for calculating a collection subset in accordance with one aspect of the present invention;

FIG. 6 is a flow diagram of an asynchronous update process in accordance with one aspect of the present invention; and FIG. 7 is a diagram illustrating an ordered structure of status_change_times for a given collection according to one aspect of the present invention.

DETAILED DESCRIPTION OF PREFERRED EMBODIMENTS

It is to be understood that the system modules and method steps described herein may be implemented in various forms of hardware, software, firmware, special purpose processors, or a combination thereof. In particular, the present invention is preferably implemented as an application comprising program instructions that are tangibly embodied on a program storage device (e.g., magnetic floppy disk, RAM, ROM, CD ROM and/or Flash memory) and executable by any device or machine comprising suitable architecture. It is to be further understood that, because some of the constituent system modules and process steps depicted in the accompanying FIGS. are preferably implemented in software, the actual connections between such components may differ depending upon the manner in which the present invention is programmed. Given the teachings herein, one of ordinary skill in the related art will be able to contemplate these and similar implementations or configurations of the present invention.

In general, the present invention is directed to a system and method for providing time-based management of a cache in an object-oriented computing environment, wherein a time-based cache manager maintains and updates a cache comprising one or more sets of objects. In an object-oriented system, the lifetime of one or more objects (or portions of such objects) may be time-dependent. As such, in accordance with the present invention, a time-dependent object may be assigned an "end_time" representing a time at which the object is no longer valid. In addition, a time-dependent object may be assigned a "start_time" representing a time when the object first becomes valid. Moreover, a time-dependent object may be assigned both a start_time and end_time. It is to be understood that a start_time or end_time may be specified explicitly (e.g., 8:00 a.m. on Mar. 15, 2000). Alternatively, such times may be defined by when an event occurs (e.g., a function is invoked with a certain set of arguments, a type of message is received, etc.) In some cases, old values for start_times and end_times may be replaced by new values. Furthermore, in some instances, start_times and end_times may be estimates.

It is to be appreciated that there are advantages to assigning start_times to objects. For instance, in a client/server system, the server can provide a plurality of objects to the client, where some of the objects are not yet valid because their start_times are sometime in the future, so as to obviate the need for future communications between the client and server to obtain such objects when they become valid (which provides a reduction in communication cost). By contrast, conventional methods do not assign start_times and require additional communications between client and server to obtain such objects (since without start_times, such objects cannot "become" valid in the future). Another advantage to assigning start_times arises in circumstances where it is more efficient to materialize a plurality of objects concurrently rather than individually, even if some, most, or all of them have start_times in the future. A further advantage is the ability to "time-shift" requests, such as a request made during off peak hours for objects that will "become" valid during prime time.

In general, a collection refers to a set of objects. More specifically, in accordance with the exemplary embodiments described herein, a "collection" may comprise a "collection superset" or a "collection subset", which terms are used to describe particular types of collections (although it is to be understood that the term "collection" and "collection superset" may be used interchangeably herein). As described below, a "collection subset" is derived from a corresponding "collection superset". A "collection superset" is generated by assigning a first_time and last_time, representing the lifetime of the collection. Each collection comprises at least one time-dependent object. It is to be understood that a collection may include a non-time dependent object (in such a case the non-time dependent object may be deemed time-dependent to the extent that the object's start_time and/or end_time can be, for example, −∞ and +∞, respectively).

Referring now to FIG. 2, a timeline diagram illustrates basic principles of operation of a time-based cache according to one aspect of the present invention. The following discussion of FIG. 2 further sets forth terminologies and definitions that will be used herein to discuss time-based cache management techniques according to the present invention. In FIG. 2, a segment of time is depicted beginning at time t0 through time t9. It is to be understood that the time sub-segments illustrated in FIG. 2 are not necessarily uniform in time (e.g., segment t1–t2 may represent 2 seconds while segment t2–t3 may represent 2 hours). A plurality of objects (211–219) are illustrated, each having a start_time and an end_time associated therewith (except for object 219 for which only an end_time is shown, and object 218 for which only a start_time is shown for the given time segment). The lifetime of a given object is represented by the time interval ranging from the start_time to the end_time of the object. By way of example, the lifetime of object 211 begins at start_time t0 and ends at end_time t2.

In addition, a plurality of collections (200, 201) (or collection supersets) are illustrated, each having a first_time and last_time associated therewith. As indicated above, the lifetime of a given collection is represented by the time interval ranging from the first_time to the last_time of the collection. By way of example, the lifetime of collection 200 begins at first_time t1 and terminates at last_time t8.

A collection represents a set of objects that may participate in the collection based on predetermined (time) conditions. For example, in a preferred embodiment, an object is eligible to participate in a given collection if the object has a lifetime that overlaps the lifetime of the collection (although it is to be understood that other non-time factors may be considered for including any particular object in a given collection). By way of example, with respect to time constraints alone, object 211 would qualify for participation in collections at any time t≧t0 and t≦t2. In particular, object 211 would be eligible to participate in collection 200 since the lifetime of object 211 (t0–t2) overlaps with the lifetime of collection 200 (t1–t8). Furthermore, as shown in FIG. 2, objects 212, 213, 214, 215, 216, and 217 would be eligible to participate in collection 200 since each meet the time criteria (i.e., each has a lifetime that overlaps that of collection 200). Furthermore, objects 219 (start_time pre-t0, end_time t0) and 218 (start_time t9, end_time post-t9) would not qualify for participation in collection 200.

Although a given collection may comprise a set of "n" objects at any given time t, only a subset of the "n" objects within a given collection may be visible to the observer at the time t. For example, as depicted in FIG. 2, at time t3, only objects 212, 213, 214, and 215 are visible to the observer of collection 200, whereas objects 211, 216, and 217 are hidden (although they are part of the collection 200). In addition, at time t6 objects 215, 216, and 217 are visible to the observer of collection 200, whereas objects 211, 212, 213, and 214 are hidden.

It is to be understood that each object start_time and end_time and each collection first_time and last_time are referred to herein as status_change_times. By way of example, time t0, t1, t2, t3, t4, t5, t6, t7, t8, and t9 of the time segment depicted in FIG. 2 are deemed status_change_times since each time corresponds with at least one of the start_times or end_times of an object or the first_time and last_times of a collection. In addition, each collection 200, 201 has its own set of status_change_times. For example, collection 200 has status_change_times t1, t2, t3, t4, t5, t6, t7, and t8 and collection 201 has status_change_times t3, t4, t5, t6, t7, and t9 (note t8 is not considered a status_change_time for collection 201 since there are no start_times or end_times of any objects associated with the collection, nor is the first_time or last_time for collection 201 at that time).

Each collection has exactly one update_time at any given time. The update_time of a collection changes over time and is based on a current_time when the update_time is calculated. More specifically, the update_time of a collection, when calculated, is the next possible status_change_time relative to the current_time. For example, assuming the current_time is t3, as depicted in FIG. 2, the update_time for both collection 200 and collection 201 is calculated as t4 (since the next possible status_change-time is the end-time of object 212, or the start_times of objects 217 and 216 at current_time t3). Furthermore, at a current_time t7, the update_time calculated for collection 200 is t8 (since the next possible status_change_time is the last_time t8 of collection 200), while the update_time calculated for collection 201 is t9 (since t9 is the next possible status_change_time corresponding to the end_time of object 216, the start_time of object 218 and the last_time of collection 201).

Referring now to FIG. 1, a block diagram illustrates a system 100 according to one embodiment of the present invention for providing time-based management of a cache. The system 100 comprises a managed cached interface 110 (application program interface), a retrieval request processor 120, an update request processor 130, a time-based cache management module 140 (or "cache manager"), a cache 150 and a database 160. The cache manager 140 manages the cache 150 by maintaining and updating one or more collection subsets stored in the cache 150 and collection supersets (possibly stored in the cache 150). As indicated above, collection supersets may be stored in the cache 150 or any other storage medium. The cache 150 is preferably implemented in software (i.e., managed memory, backed by disk) although one skilled in the art may envision other cache implementations depending on the application (e.g., a database cache such as IBM's DB2 database or a processor cache such as the cache in IBM's RS/6000 line of computers). For the purposes of the following discussion, it is assumed that the database 160 stores all of the relevant persistent data, as well as a plurality of time-dependent objects or sets of such objects (collectively referred to as "entities") from which the collections are generated.

It is to be understood that each of the system components of FIG. 1 may reside on a single machine, device or platform in a network. Alternatively, the system components may be distributed over a network. By way of example, assume that the system 100 is designed to cache query results in a database application. The system 100 may comprise a client application (with the cache) that issues queries to a server (which manages the database 160) that is remote from the client. To reduce the number of queries to the server, the client stores one or more sets of query results (collection subsets) in the local cache 150. In the following discussion of preferred embodiments, it is assumed that the system 100 manages a cache that stores collection subsets of objects comprising database query results. It is understood, however, that one of ordinary skill in the art may readily envision collections of other object types (instead of query results) that may be employed.

The managed cache interface 110 provides an interface for communication between outside entities and the system 100. For example, an outside entity might be a client application seeking to utilize locally cached predictable time-varying query results obtained from a remote server over a network. In addition, the outside entity may be a remote server providing updated information to the local cache about a changed entity or set of entities that are stored in the cache. The managed cache interface 110 routes retrieval requests to a retrieval request processor 120. Such retrieval requests include requests from a client or server to obtain one or more cached collection subsets stored in the cache 150. Furthermore, the managed cache interface 110 routes update requests via an update request processor 130. As indicated above, a remote server may send update information to the client cache manager 140 to, e.g., update an object, a collection, or a collection subset stored in the local cache 150, in response to an update request transmitted from the client to the server. Each of these request processor modules independently interact with the cache manager 140.

The cache manager 140 comprises a plurality of modules, each of which are employed at various times to execute specific tasks. In a preferred embodiment, the cache manager 140 comprises a collection query module 141, a collection refresh module 142, a collection subset module 143, an initialization module 144, a configuration module 145, and an asynchronous update module 146. The function of each of these modules will now be discussed.

The initialization module 144 performs an initialization process per each cache management system boot. The initialization process is responsible for bringing into the cache the collection subsets (and possibly collections) that are likely to be used during the normal course of business. This determination can be made in several ways, one example commonly used being based upon usage data from recent previous executions. Other forecasting mechanisms for likely collection usage are possible; such functions can be "plugged" into the initialization process. Certain environmental and configuration factors may also be used to define the set of collection subsets (and possibly collections) that are to be pre-fetched into the cache during initialization. Environmental factors may include cache size, selected collections size, expected frequency of use, and so forth.

In addition, the initialization module 144 is called upon to prepare the cache manager 140 for retrieval and update requests. In particular, when either the retrieval request processor 120 receives a retrieval request or the update request processor 130 receives an update request from the managed cache interface 110, each request processor 120, 130 will determine whether or not the cache manager 140 has been initialized. If not, the request processors 120, 130 will call upon the initialization module 144 to initialize the cache manager 140 for the retrieval and update requests. Such initialization tasks include, for example, initializing the actual cache 150 and initializing a polling time (if polling is employed) that is utilized by the asynchronous update module 146 (as described below).

The configuration module 145 is called upon to store and supply configuration data that may be needed for the initialization process and other processes. A configuration process is called by the cache manager 140 to supply configuration data whenever such data is required for some decision making or whenever data is to be updated or newly added. Such configuration data may include data that is utilized by the collection refresh module 142 to calculate the first_time and last_time for a collection superset (as described in detail below). Furthermore, configuration data that can be requested and updated by other processes includes the value for setting the polling timer in the asynchronous update module (as described in detail below).

Upon initialization of the cache manager 140, the collection query module 141, collection refresh module 142 and/or the collection subset module 143 are utilized to generate/retrieve a desired collection subset (e.g., query results). The collection query module 141 retrieves a collection subset from the cache and returns the collection subset, possibly null, in response to a directed request from the retrieval request processor 120. More specifically, if a collection subset corresponding to the request exists in the cache 150 and the collection subset does not need to be updated as of the time of the request, the collection query module 141 will return the cached collection subset.

Alternatively, if, at the time of the request, the desired collection subset needs to be updated and if the corresponding collection superset (from which the collection subset was generated) is "valid," the collection query module 141 will call the collection subset module 143 to calculate a new collection subset from the corresponding collection superset. The collection query module 141 will then assign a new update_time to the new collection subset, and then return the new collection subset to satisfy the request.

Alternatively, if, at the time of the request, the desired collection subset requires an update and if the corresponding collection superset (from which the collection subset was generated) is not "valid," the collection query module 141 will call the collection refresh module 142 to obtain current and consistent results. More specifically, the collection refresh module 142 will update the collection superset based on predetermined time criteria, call the collection subset module 143 to generate a new collection subset from the updated collection superset, assign an update_time for the new collection subset, and then return the new collection subset.

In addition, upon initialization of the cache manager 140, the collection refresh module 142 is utilized by the update request processor 130 to update any collection (collection superset or collection subset) that is affected by any update information received by the update request processor. The functions of the collection query module 141, the collection refresh module 142 and the collection subset module 143 are discussed in greater detail below with reference to FIGS. 3, 4 and 5, respectively.

The asynchronous update module 146 enables communication between the client and server to update one or more cached collection subsets (e.g., query results) or collection supersets (it is to be understood that asynchronous methods described herein are the preferred methods notwithstanding that synchronous update methods may be applied if desired or necessary). Such updates may be required for various reasons. For instance, the start_time and/or end_time and/or other attribute of an object in the database 160 may be modified, thus necessitating the update of any cached collection subset (and possibly collection) having such modified object. Such update information may be received by a server that "pushes" cache updates to the client. In addition, such update information may be "pulled" by the client by requesting update information from the server. Update information from servers can include updates that must be made immediately, such as an existing object attribute value change, as well as updates that may occur at sometime in the future, such as the addition of a new object having a start_time that is greater than a current_time.

In addition, update messages can include information from servers about when the next set of updates are expected. This information is particularly important when clients are polling the server to obtain update information. Polling, if utilized, is done frequently enough to result in current caches but not frequently enough to cause significant overhead. If the number of clients is large, polling time can be staggered so as to prevent all the clients from polling a server at the same time. In distributed systems, client/server communication can be very expensive (performance wise).

It is to be appreciated that one of the advantages of the present invention is that when a client caches a query result, it allows the client to update its cache automatically (based on information stored in the cache, for example) without having to contact the server. The following example provides an overview of the present invention and its advantages. Assume that a user issues a query q1 to a database. Query q1 may consist of a time-independent part p1(q) and a time-dependent part which filters out objects that are not valid at a current_time. An object 0 is deemed valid at a current_time if:

$$\text{start\_time}(0) \leq \text{current\_time and end\_time}(0) \geq \text{current\_time}.$$

Thus, query q1 is logically equivalent to:

$$p1(q) \text{ and start\_time} \leq \text{current\_time and end\_time} \geq \text{current\_time}.$$

This query would return all objects (stored in database) that are only valid at the current_time. In accordance with the present invention, however, to cache objects satisfying query q1, rather than issuing query q1, the client will expand the query to obtain a set of objects S1 (collection superset) that may satisfy query q1 between, for example, the current_time and some time in the future, last_time. It does so by issuing a query of the form:

$$p1(q) \text{ and end\_time} \geq \text{current\_time and start\_time} \leq \text{last\_time}.$$

Accordingly, the collection superset (result set S1) will include not only the objects satisfying q1 that are valid at the current_time, but also objects satisfying q1 that are valid at some point between current_time and last_time. This collection superset of objects may then be stored in the cache (or other storage medium), along with the start_times and end_times for the objects.

It is to be understood, however, that since query results (collection subset) obtained from corresponding collection supersets vary over time, the present invention provides a mechanism to update the collection subsets stored in the cache. In a preferred embodiment, the cache stores a list of end_times and start_times (between the current_time and the last_time) for objects in S1 in chronological order. If the list contains enough times, a more complex yet more efficient data structure, such as a balanced tree, may be used instead of a linked list for greater efficiency. The cache manager will determine an update_time for the collection subset based on the list of object start_times and end_times. Whenever a request for query q1 is received before last_time (i.e., the current_time of the query is received before the future time that was initially selected to expand the query and generate the collection superset S1), the cache manager determines whether the cached collection subset is still valid by checking its update_time against the current_time. If the cached collection subset has expired (i.e., the current_time is greater than the update_time) the client automatically updates the cached collection subset without contacting the server by scanning the list of start_times and end_times in order to remove objects that have expired and add new objects whose start_times have passed. It also assigns a new update_time for the cached collection subset by examining the list of times.

On the other hand, whenever a request for query q1 is received after last_time, the cache manager determines a new last_time and repeats the process for contacting the server to determine objects which satisfy query q1 both at the current_time and in the future up to the new last_time. These concepts are discussed in greater detail below with reference to FIGS. 3–5.

Referring now to FIG. 3, a flow diagram illustrates a collection query process in accordance with one aspect of the present invention. More specifically, FIG. 3 illustrates a preferred method of operation of the collection query module 141 of FIG. 1. Initially, upon receiving a query, a determination is made as to whether a collection corresponding to the query exists (step 300). As indicated above, a given collection may comprise a set of all objects (query results) which satisfy a query over a period of time. If the results do not currently exist (negative determination in step 300) (because, e.g., either the desired collection had expired and been deleted or a collection corresponding to the query had never been previously materialized), then a collection refresh process is initiated (step 310). As described in greater detail below with reference to FIG. 4, the collection refresh process is employed to either materialize a collection that satisfies the query (and possibly store it in the cache) or update a previously existing collection that is not valid at the current_time at which the query was issued. On the other hand, if the collection corresponding to the query already exists (affirmative determination in step 300), the collection refresh process is bypassed for the moment.

Once the collection is determined to exist (either because the collection already exists (step 300) or is materialized or updated as a result of the collection refresh process (step 310)), a determination is made as to whether a current collection subset is valid at the current_time (step 320) (i.e., if the current_time is less than a previously calculated update_time for the collection). As indicated above, a current collection subset of the collection is a subset of objects that are "visible" to the user at the current_time. The determination process of step 320 is illustrated by the following example with reference to FIG. 2.

Assume the following conditions: the current_time is between t4 and t5 (e.g., t4.5); the desired collection is collection 200; and the previous update_time calculation for collection 200 occurred at time t4 (calculating time t5 as the update_time). Based on these assumed conditions, a collection subset of collection 200 consisting of objects 213, 214, 215, 216, and 217 is valid at the current_time t4.5 (since the current_time is less than the update_time t5). On the other hand, if the current_time and update_time are t5 (or if the current_time is greater than the update_time t5) the same collection subset (i.e., objects 213–217) of collection 200 that were valid at current_time t4.5 would be determined to be invalid at update_time t5 because objects 213 and 214 (at least) are no longer eligible as members of the collection subset.

Referring back to FIG. 3, if the current collection subset is determined to be valid (affirmative determination in step 320) (i.e., the current_time is less than the previously calculated update_time for the collection), then the current collection subset is retrieved from the cache (step 370) and processing is completed. On the other hand, if the current collection subset is not valid (negative determination in step 320) (i.e., the current_time is not less than the previously calculated update_time for the collection), then further processing is required (beginning at step 330) to obtain a valid collection subset.

Such further processing comprises determining whether a new current collection subset can be derived from the current collection. More specifically, if the current_time is less than the first_time of the current collection (i.e., the collection first_time is in the future) (affirmative determination in step 330), then control flows to the collection refresh process (step 310) (which is described in detail below) to calculate a new superset (collection) and a new collection subset. This situation (i.e., current_time <first_time) may arise, for example, when a collection is materialized at a current_time having a first_time greater than the current_time in anticipation of future needs, wherein it was assumed at the time of materialization that objects falling between the current_time and the first_time of the collection would not be needed, and there is some advantage to materializing the collection prior to the actual anticipated demand (e.g., materialization during off-peak usage hours, etc.)

On the other hand, if the current_time is not less than the first_time of the current collection (negative determination in step 330) (i.e., the collection first_time is valid at the current_time), the collection last_time is examined with respect to the current_time to determine whether the collection last_time is valid at the current_time. In particular, if the current_time is greater than the collection last_time (i.e., the last_time has passed)(affirmative determination in step 340) then control flows to a collection refresh process (step 310) to calculate a new collection having a new first_time and last_time and the current correct subset.

On the other hand, if the current_time is not greater than the collection last_time (negative determination in step 340) then a new collection subset is calculated (step 350) based on the member objects in the current collection. It is to be understood that step 350 is performed based on the information stored in the cache as opposed to accessing the server database or local database to retrieve objects to calculate the new collection subset or otherwise update the collection. A process for calculating a new current collection subset (via the collection subset module) according to one aspect of the invention is described in detail below with reference to FIG. 5.

After the new collection subset is calculated (step 350), a new update_time is determined (step 360). Preferably, the new update_time is determined to be the next time when the new collection subset becomes invalid (i.e., when any object in the new collection subset goes out of scope or when any object currently in the collection but not yet in the new collection subset comes into scope with respect to time). Preferably, the new update_time is calculated by referring to the ordered status_change_times structure and selecting the closest future time relative to the current_time. Once the new update_time is calculated (step 360), the new collection subset (which is the current collection subset) is retrieved from the cache (step 370) and processing is completed.

Referring now to FIG. 4, a flow diagram illustrates a collection refresh process (i.e., step 310 in FIG. 3) according to one aspect of the present invention. More specifically, FIG. 4 illustrates a preferred method of operation of the collection refresh module 142 of FIG. 1. Initially, a determination is made as to whether the desired collection exists (step 400). Assuming that a negative determination was previously made (in step 300 of FIG. 3) as to the existence of the desired collection, then a negative determination will also be made (in step 400) that the desired collection does not exist in the cache. In this situation, an "empty collection" will be generated (step 410) (i.e., a new collection is initialized). On the other hand, assuming that an affirmative determination was previously made (in step 300 of FIG. 3) as to the existence of the desired collection, then an affirmative determination will also be made (in step 400) that the desired collection exists.

Once a collection has been established, empty or otherwise, the next step is calculating the first_time and last_time boundaries for the collection (step 420). This calculation process includes retrieving configuration data from the configuration module 145 (FIG. 1). Such information may include maximum cache size, maximum collection size, maximum distance between first and last time boundaries, etc. Furthermore, the calculation of the collection first_time and last_time values may take into account the number of potential objects in the resulting collection and the likelihood of using them in any particular subset, amongst other criteria.

Next, an object removal process is performed (step 430) which involves separating out any objects currently in the collection that no longer meet the time requirements for remaining as elements of the collection. More specifically, in a preferred embodiment, each object having a start_time that is strictly greater than the collection last_time is removed from the collection. Similarly, each object having an end_time that is strictly less than the collection first_time is removed from the collection. By way of example with reference to FIG. 2, assume collection 200 (having first_time t1 and last_time t8) had newly calculated first_time and last_time values that would transform it into collection 201 (having first_time t3 and last_time t9) (for this example, it is assumed that the collections 200 and 201 correspond to the same query, but have different first_times and last_times). Based on these newly calculated values, using the conditions described above in step 430, object 211 would be removed from the resulting collection 201, since neither the start_time (t0) nor the end_time (t2) of object 211 would qualify it for remaining as a part of the newly calculated collection 201.

The next step in the collection refresh process is to perform an object addition process (step 440) which involves adding any objects (not currently in the collection) that meet predetermined time requirements for becoming an element of the collection. More specifically, in a preferred embodiment, each object (that is stored in the local and/or remote database) having a start_time that is less than or equal to the collection last_time and an end_time that is greater than or equal to the collection first_time is added to the collection (assuming the object is not already a member of the collection). By way of example with reference to FIG. 2, assume collection 200 had newly calculated first_time and last_time values that would transform it into collection 201 (having a first_time t3 and a last_time t9) (again, for this example, it is assumed that the collections 200 and 201 correspond to the same query, but have different first_times and last_times). Based on the newly calculated values, object 218 would be added to the resulting collection 201, since its start_time (t9) would qualify it for inclusion as a part of the newly calculated collection 201.

After the object addition process (step 440), the next step is to either create or update an ordered structure of status_change_times (step 450). This structure does not necessarily have to contain the first_time and/or last_time. It is to be appreciated that the structure could be, for example, a simple list when the number of status_change_times is small. In addition, such a structure could be a balanced tree structure when the number of status_change_times is larger, or some other suitable structure. By way of example, FIG. 7 depicts a portion of a structure of status_change_times corresponding to collection 200 of FIG. 2, wherein status_change_time t2, for example, is listed as corresponding to the end_time of object 211, the start_time of object 212 and the start_time of object 213. In any event, it is to be understood that the selection of the structure and the ordering of the status_change_times within such structure is preferably employed in a manner as to render the update_time calculation process and collection subset updating process highly efficient.

Next, a process is invoked for calculating a new collection subset (step 460) using the newly updated collection. This process is described below in detail with reference to FIG. 5. Briefly, this process involves generating a new collection subset (of objects) from the set of objects comprising the new collection based on the relationship between a current_time and the start_times and end_times of each of the objects of the collection.

After the new collection subset is calculated, a new update_time is determined (step 470). As indicated above, the new update_time is determined to be the next time when the new subset becomes invalid, which is when any object currently in the new collection subset goes out of scope with respect to time or when any object currently not in the new collection subset comes into scope with respect to time or when the collection expires. The new update_time is calculated by referring to the ordered status_change_times structure and selecting the closest future time relative to the current_time. The collection refresh process is complete after the new update_time is determined.

Referring now to FIG. 5, a flow diagram illustrates a method for calculating a new collection subset in accordance with one aspect of the present invention. In particular, FIG. 5 illustrates a preferred method of operation of the collection subset module 143 of FIG. 1 (as well as step 350 of FIG. 3 and step 460 of FIG. 4). Initially, a determination is made as to whether the collection subset exists within the cache (step 500). For example, a collection subset will not currently exist in the cache (negative determination in step 500) if the corresponding collection was just materialized (step 410 of the collection refresh process). In this situation, an empty collection subset is materialized (step 510). If, on the other hand, the collection subset already exists in the cache (affirmative determination in step 500) then the empty collection subset materialization process is not employed.

In any event, once the collection subset has been established, empty or otherwise, the next step is to determine the current_time (step 520). After the current_time is determined, an object removal and addition process is performed (step 530). More specifically, this process involves removing objects currently in the collection subset that no longer meet the time requirements for remaining as elements of the collection subset. More specifically, in a preferred embodiment, each object having (i) a start_time that is strictly greater than the current_time or (ii) an end_time that is strictly less than the current_time is removed from the collection subset. By way of example with reference to FIG. 2, if a new subset for collection 200 (having first_time t1 and last_time t8) were calculated at time t2, the subset would contain objects 211, 212 and 213. If a new subset for collection 200 was calculated at time t3, however, object 211 would not be in the subset.

Furthermore, any objects that are not currently in the collection subset and which meet the time requirements for becoming an element of the collection subset are necessarily included in the collection subset. More specifically, in a preferred embodiment, each object having (i) a start_time that is less than or equal to the current_time and (ii) an end_time that is greater than or equal to the current_time is added to the collection subset. By way of example with reference to FIG. 2, if a new subset for collection 201 (having first_time t3 and last_time t9) was determined at time t3, it would contain objects 212, 213, 214, and 215. If a new subset for collection 201 was calculated at time t4, objects 216 and 217 would be added to the collection 201 subset. A preferred method for achieving this is scanning the ordered structure of status_change_times from the update_time to the current_time. Whenever a start_time is encountered, the corresponding object is added. In addition, whenever an end_time is encountered, the corresponding object is deleted. Once the removals and additions have occurred (step 530), the collection subset process is complete.

It is to be understood that the collection refresh process of FIG. 4 and the subset calculation process of FIG. 5 are not necessarily performed automatically at every status_change_time or update_time.

Referring now to FIG. 6, a flow diagram illustrates an asynchronous update process in accordance with one aspect of the present invention. More specifically, FIG. 6 illustrates a preferred method of operation of the asynchronous update module 146 (FIG. 1) (although it is to be understood that synchronous update methods may be employed if desired or necessary). As indicated above, this process operates in the background allowing the client and server to communicate to update one or more collection supersets and/or cached collection subsets, if necessary. The need for updating a cached collection subset (query result), for example, may arise due to one or more circumstances. For example, the start_time and/or end_time of an object in the database may be modified, a new object may be created, an existing object may be deleted, or an existing object may have been modified in some manner that disqualifies it from a collection (e.g., a collection of homeowner policies in effect Apr. 1, 2000 through Mar. 31 2001 with values <$1 million has to be updated if a particular policy in that collection is updated with a value >$1 million; or if a new policy meeting these criteria is created; or if an existing policy already in the collection is deleted). As described below, a server may "push" a cache update to the client having the cached sets of objects. In addition, a client may be configured to "pull" (i.e., request) update information from a remote or local server having the database of objects.

An asynchronous update process begins by determining if the cache is configured for "pulling" updates from the collection source (e.g., database of a server) (step 600). If the pull methodology is utilized by the client (affirmative determination in step 600), then the polling timer is set (step 610) to place the process in a "wait state" (step 620). As described below, the expiration of the polling timer will cause the process to resume from its wait state. The future time at which the polling timer is scheduled to expire is derived from configuration data that is obtained by consulting the configuration module.

If the client does not utilize a pull method (negative determination in step 600) then a polling timer is not set (step 610 is bypassed) and it is assumed that the collection source (server) is "pushing" updates out to the cache manager (client). In either event (e.g., push or pull), the process flow enters into the wait state (step 620) to wait for some event to occur, the occurrence of which causes termination of the wait state. For instance, assuming the push method is utilized, the wait state is exited if the event is an update (from the server) (affirmative result in step 630). An update can include, for example, the creation of a new object, the deletion of an existing object, or a modification of an existing object with respect to a new start_time and/or end_time, or some other relevant change. Furthermore, assuming a pull method is utilized as indicated above, the wait state is exited upon the expiration of the polling timer (affirmative result in step 650).

If the wait state is exited due to the occurrence of an update event (affirmative result in step 630), then process flow continues to determine what course of action is required based upon the type of update (step 640). Any collections and/or collection subsets that are affected by the update are modified (step 640) to reflect the changed state. For example, in the case of a new object, the new object will be added to all the collection subsets stored in the cache where appropriate as if the collection refresh process (described above with reference to FIG. 4) was employed. Similarly, in the case of a deleted object, the object will be removed from all the collection subsets stored in the cache where appropriate as if the collection refresh process was employed. In the case of a change in an object start_time or end_time, the object will be added to, deleted from, or remain in collections where appropriate as if the collection refresh process described above was employed. Once adjustments have been made, control returns to enter the wait state (step 620).

If the wait state is not terminated due to the occurrence of an update event (negative result in step 630) (i.e., the push method is not utilized), then control flows to determine if a wake-up event occurred (step 650). For instance, if the wait state ends due to the expiration of the polling timer (affirmative result in step 650), then the client having the cache will proceed to request updates from the local/remote server (step 660). Updates are requested (step 660) to keep collections from becoming stale. Updates are requested for the time covering the period from the last request for updates (or since initialization if no prior updates requests were made) up to the present time. Once the request has been made, the process is repeated by once again setting the polling timer (step 670) with some future expiration time, and entering the wait state (step 620) in anticipation of some event occurrence.

If the wait state did not terminate due to the expiration of the polling timer (negative result in step 650), then the process is terminated, due to either system shutdown or some unexpected event.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. By way of example, in another embodiment, objects having cyclic lifetimes may be considered as opposed to single lifetimes. For instance, an object may be valid on Wednesdays or other objects may be valid weekdays. from 10:00 a.m. to 2:00 p.m. ET. This can be handled by having multiple ("start", "end") pairs for such objects. Indeed, an object may be assigned multiple start_times and/or end_times. For example, referring to FIG. 2, it may be the case that Object 211 and Object 214 are the same except for their ("start", "end") periods.

In another embodiment, time may proceed in reverse, ever decreasing instead of the usual ever;increasing. This can be handled by the same machinery and by multiplying each start, end, first, and last_time by negative one (−1). In yet another embodiment, as opposed to pre-fetching collections at initialization, pre-fetching may occur at times other than initialization, such as predetermined intervals, at triggered event occurrences etc. Criteria and mechanisms used for pre-fetching at initialization can be used at times other than initialization, and vice-versa.

In another embodiment of the present invention, if the cache manager determines that the end_time for an object in a cached subset of objects has elapsed, the cache manager may query the server to determine if the object is still valid, and if so, assign a new end_time for the object and keep the object in the cached subset of objects. In yet another embodiment, if the cache manager determines that the end_time for an object in a cached subset of objects has elapsed, the cache manager may query the server to obtain a new value for the object and store the new value in the cached subset. It is to be understood that all such changes and modifications are intended to be included within the scope of the invention as defined by the appended claims.

What is claimed is:

1. A method for storing objects in a system comprising a plurality of objects, the method comprising the steps of:
   assigning a start time to one or more of the plurality of objects, wherein a start time is an attribute of an object and wherein the start time represents a time when the object becomes valid;
   generating a set of objects comprising at least one object having an assigned start time;
   storing the set of objects in a storage medium; and
   in response to a query, returning the at least one object having the assigned start time, if the object is valid at a time corresponding to the query.

2. The method of claim 1, further comprising the step of assigning an end time to at least one of the plurality of objects.

3. The method of claim 2, further comprising the steps of:
   designating a collection by assigning a first time t1 and a last time t2, wherein t2 is greater than t1; and
   selecting, as a member of the collection, one or more of the plurality of objects having an end time that is not less than t1 and a start time that is not greater than t2.

4. The method of claim 3, further comprising the step of determining a collection subset from the collection, wherein the collection subset comprises objects having an elapsed start time and having an end time that has not elapsed.

5. The method of claim 4, further comprising the step of ordering, between t1 and t2, start times and end times of objects in the collection.

6. The method of claim 5, wherein the ordering is stored in one of a list and a balanced tree.

7. The method of claim 5, further comprising the step of updating the collection subset using the ordered start times and end times.

8. The method of claim 7, wherein the step of updating comprises adding into the collection subset an object having a currently elapsed start time.

9. The method of claim 7, wherein the step of updating comprises deleting from the collection subset an object having a currently elapsed end time.

10. The method of claim 5, further comprising the step of assigning an update time to the collection subset using the ordered start times and end times.

11. The method of claim 10, wherein the update time is one of the earliest end time of an object in the collection subset and the earliest non-elapsed start time of an object that is included in the collection but not included in the collection subset.

12. The method of claim 4, wherein the storage medium is a cache and wherein the set of objects stored in the storage medium comprises one of the collection, the collection subset and both.

13. The method of claim 1, wherein the set of objects comprises a set of objects satisfying a query.

14. The method of claim 1, wherein the storage medium is a cache associated with a client and the plurality of objects are associated with a server, and further comprising the step of sending a message from the server to the client to update the cache.

15. The method of claim 14, wherein the message comprises one of a new start time in the future and an end time in the future for an object.

16. The method of claim 14, further comprising the step of periodically sending a request by the client to the server to request cache update information.

17. The method of claim 14, further comprising the step of periodically requesting, by a plurality of clients, cache update information from the server, wherein the requests occur at different times.

18. The method of claim 14, wherein the message comprises information indicating a time in the future when new cache update information is one of available and likely to be available.

19. The method of claim 1, wherein the method, steps are tangibly embodied as program instructions on a program storage device, wherein the program instructions are readable and executable on a machine to perform the method steps.

20. A method for managing a cache in a system comprising a plurality of objects, the method comprising the steps of:
   caching a set of objects, wherein the set of objects comprises at least one object having an assigned start time or a start time and end time, wherein the start time is an attribute of an object and wherein the start time represents a time when the object becomes valid and the end time represents a time when the object becomes invalid;
   assigning an update time corresponding to a time at which the cached set of objects becomes invalid;
   determining, at a current time, if the cached set of objects is valid based on the update time; and
   updating the cache if the cached set of objects is determined to be invalid.

21. The method of claim 20, wherein the cached set of objects comprises query results associated with a query.

22. The method of claim 20 wherein the update time comprises one of an end time of an object in the cached set of objects, a start time of an object in the cached set of objects, a start time of an object that is not a member of the cached set of objects and an end time of an object that is not a member of the cached set of objects.

23. The method of claim 20, wherein the step of updating the cache comprises the step of updating the cached set of objects by one of deleting from the cached set of objects an object having an end time that has elapsed at the current time, adding into the cached set of objects an object having a start time that has elapsed as of the current time and a combination thereof.

24. The method of claim 20, further comprising the steps of:
   assigning one of a start time, an end time, and a start time and end time to at least one of the plurality of objects; and
   generating a superset of objects from the plurality of objects based, at least in part, on predefined time criteria, wherein the superset comprises objects that are used to update the cached set of objects.

25. The method of claim 24, wherein the step of generating the superset comprises:
   assigning a first time t1 and a last time t2 to the superset of objects; and
   selecting, as a member of the superset, at least one object from the plurality of objects having an end time that is not less than t1 and a start time that is not greater than t2.

26. The method of claim 25, wherein the update time comprises one of t1, t2, an end time of an object in the superset, and a start time of an object in the superset.

27. The method of claim 25, wherein the cached set of objects is deemed invalid if the update time has elapsed as of the current time, and wherein the step of updating comprises a step of one of deleting from the cached set of objects an object having an end time that has elapsed as of the current time, selecting from the superset, for inclusion in the cached set of objects, an object having a start time that has elapsed as of the,current time, and a combination thereof.

28. The method of claim 27, further comprising the step of updating the superset at the current time if the current time does not fall within the range of t1 through t2.

29. The method of claim 28, wherein the step of updating the superset comprises the steps of:

calculating one of a new first time, a new last time, and a combination thereof for the superset of objects; and removing from the superset an object having one of a start time that is greater than the new last time and an end time that is less than the new first time; and adding into the superset an object from the plurality of objects having a start time that is not greater than the new last time and an end time that is not less than the new first time.

30. The method of claim 28, further comprising the step of calculating a new cached set of objects in response to the updating of the superset; and determining a new update time for the new cached set of objects.

31. The method of claim 24, further comprising the step of storing the superset in a cache.

32. The method of claim 20, wherein the method steps are tangibly embodied as program instructions on a program storage device, wherein the program instructions are readable and executable on a machine to perform the method steps.

33. A system for managing a cache, comprising:

a cache for storing at least one set of objects, wherein the at least one set of objects stored in the cache comprises at least one object having an assigned start time or a start time and end time, wherein the start time and end time are attributes of an object and wherein the start time represents a time when the object becomes valid and wherein the end time represents a time when the object becomes invalid;

at least one client comprising a cache manager for providing time-based management of the cache, wherein in response to a query for an object, the cache manager will return the object if the object is valid at a time corresponding to the query based on at least the start time of the object; and at least one server for providing information to the at least one client for updating the cache.

34. The system of claim 33, wherein the server comprises a database comprising a plurality of objects from which the at least one set of objects stored in the cache is generated.

35. The system of claim 33, wherein the cache manager comprises a data configuration module for designating a collection by assigning a first time t1 and a last time t2, wherein t2 is greater than t1; and a collection refresh module for selecting, as a member of the collection, at least one object from a plurality of objects having an end time that is not less than t1 and a start time that is not greater than t2.

36. The system of claim 35, wherein the cache manager further comprises a collection subset module for determining a collection subset from the collection, wherein the collection subset comprises objects having an elapsed start time and having an end time that has not elapsed, and wherein the collection subset comprises the at least one set of objects stored in the cache.

37. The system of claim 36, wherein the collection refresh module orders, between t1 and t2, start times and end times of objects in the collection.

38. The system of claim 37, wherein the collection subset module updates the collection subset using the ordered start times and end times.

39. The system of claim 38, wherein the update comprises one or adding into the collection subset an object having a currently elapsed start time, deleting from the collection subset an object having a currently elapsed end time, and combination thereof.

40. The system of claim 37, wherein the cache manager assigns an update time to the collection subset using the ordered start times and end times.

41. The system of claim 40, wherein the update time is one of the earliest end time of an object in the collection subset and the earliest non-elapsed start time of an object that is included in the collection but not included in the collection subset.

42. The system of claim 33, wherein the update information comprises one of a new start time in the future and an end time in the future for an object.

43. The system of claim 33, wherein the update information indicates a time in the future when new cache update information is one of available and likely to be available.

44. A method for storing objects in a system comprising a plurality of objects, the method comprising the steps of:

assigning a start time to an object, wherein the start time is an attribute of the object and wherein the start time represents a time when the object becomes valid;

storing the object in a storage medium; and in response to a query, returning the stored object if the object is valid a time corresponding to the query.

45. A program storage device readable by machine, tangibly embodying a program of instructions executable by the machine to perform method steps for storing objects in a system comprising a plurality of objects, the method steps comprising:

assigning a start time to an object, wherein the start time is an attribute of the object and wherein the start time represents a time when the object becomes valid;

storing the object in a storage medium; and in response to a query, returning the stored object if the object is valid a time corresponding to the query.

* * * * *